US006529519B1

United States Patent
Steiner et al.

(10) Patent No.: US 6,529,519 B1
(45) Date of Patent: Mar. 4, 2003

(54) PRIORITIZED-BUFFER MANAGEMENT FOR FIXED SIZED PACKETS IN MULTIMEDIA APPLICATION

(75) Inventors: Leon Steiner, Yorktown Heights, NY (US); Samir Hulyalkar, Plainsboro, NJ (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/218,559

(22) Filed: Dec. 22, 1998

(51) Int. Cl.$^7$ .................................................. G03B 1/00
(52) U.S. Cl. ...................... 370/412; 370/395.7; 711/147
(58) Field of Search ................................ 370/412, 413, 370/419, 420, 421, 429, 395.1, 394, 310, 321, 337, 465, 469, 473, 474, 428, 395, 378; 711/122, 117, 118, 139, 144, 145; 707/100, 205

(56) References Cited

U.S. PATENT DOCUMENTS

| 5,175,732 A | | 12/1992 | Hendel et al. ............. 370/94.1 |
| 5,638,371 A | * | 6/1997 | Raychaadhuri ............. 370/347 |
| 5,684,791 A | * | 11/1997 | Raychaudhuri ............. 370/278 |
| 5,724,362 A | * | 3/1998 | Lau ............................. 371/5.1 |
| 5,774,465 A | * | 6/1998 | Lau ............................ 370/397 |
| 5,893,162 A | * | 4/1999 | Lau ............................. 711/153 |
| 6,198,728 B1 | * | 3/2001 | Hulyalkar .................... 370/252 |
| 6,356,561 B1 | * | 3/2002 | Lau ............................. 370/462 |

OTHER PUBLICATIONS

By A.H. Duke: Storage Allocation Mechanism IBM Technical Disclosure Bulletin, US, IBM Corp. New York, vol. 17, No. 9, Feb. 1, 1975 pp. 2606–2610.

By H.R. Van As et al. "CRMA–11: A MAC Protocol for Ring–Based Gb/s LANS and MANs" Computer Networks and ISDN Systems 26 (1994) pp. 831–840.

* cited by examiner

Primary Examiner—Douglas Olms
Assistant Examiner—Ricardo M. Pizarro
(74) Attorney, Agent, or Firm—Jack D. Slobod

(57) ABSTRACT

A prioritized buffer for the Medium Access Control (MAC) layer for multimedia applications, in particular wireless Asynchronous Transfer Mode (ATM) in which reservation based TDMA is performed on the basis of control data frames (CDFs), is formed by an addressable memory system which is divided into sequential equal-sized pages for storing respective data packets or ATM cells having the same number of bytes. The memory system includes a tag register for storing tags associated with the respective pages, each tag indicating whether the associated page is empty or full, a shadow register for storing conflict-free updates from the tag register, and a page register for storing pointers to the lowest free or unoccupied page. Sequential buffer addresses of memory locations in the memory system, which control sequential writing into the buffer of bytes contained in data packets, are generated from summing a first address component responsive to the contents of the page register and a second address component which is a byte count of a current packet being received from a stream data source. A succession of byte addresses is produced which jumps over addresses within pages which are full, thereby bypassing and avoiding overwriting pages which are full.

14 Claims, 4 Drawing Sheets

PRIORITIZED-BUFFER MANAGEMENT FOR FIXED SIZED PACKETS IN MULTIMEDIA APPLICATION

BACKGROUND OF THE INVENTION

The present invention relates to stream data applications where a sequentially accessed buffer is used, and in particular to buffer systems employing memory management to prevent loss of still required or "leftover" buffer contents as a result of overwriting. The present invention also pertains to management of a prioritized buffer for stream data organized in fixed size packets or cells, as may be employed in wireless multimedia applications.

Wireless voice communications such as provided today by cellular systems have already become indispensable, and it is clear that future wireless communications will carry multimedia traffic, rather than merely voice. ATM (asynchronous transfer mode) technology has been developed over wired networks to carry high-speed data traffic with different data rates, different quality-of-service (QoS) requirements (for example, data reliability, delay considerations, etc.), different connection or connectionless paradigms, etc. for multimedia communications. It is then natural to assume that in the future wireless ATM-based (WATM) service will be provided at the consumer end of a wired network.

Existing efforts towards building a wireless local-area network (LAN) are focused around emerging standards of IEEE 802.11 in the United States and HIPERLAN in Europe. While these standards are almost mature, their development did not take into consideration ATM-based service requirements of QoS guarantees for both real-time and data traffic. Essentially, these requirements come about by multiplexing video, audio, and data services (multimedia) in the same medium. Audio data does not require the packet-error reliability required of data services, but cannot tolerate excessive delay. Video data can in general suffer more delay than audio; however it is intolerant to delay jitter. These delay and packet-error rate considerations forced ATM to adopt a connection-oriented service. It also forced error-control to be done end-to-end, instead of implementing error-control between every two nodes within the specified connection (error-control is a method of ensuring reliability of packets at a node, whereby a packet error is detected, and then a packet retransmission request is sent to the transmitting node). Such a strategy was feasible with the wired fiber-optic networks, which has a very small packet error rate. Wireless networks do not in general provide such low-error rates.

Delay considerations are also important for ATM service. A wired ATM network will simply block any services for which it cannot guarantee the required QoS. Typically wireless networks do not allow such a feature; the delay actually can increase exponentially in an overloaded network. Such a channel-access protocol is indeed specified in IEEE 802.11 and HIPERLAN.

The services that are supported over ATM have one of the following characteristics with regards to the time-varying feature of the data rate of service; also listed are the QoS parameters which are expected to be sustained by the network:

Constant Bit Rate (CBR): Specify Bit Rate
Variable Bit Rate (VBR)—RT: Specify Sustained Cell Rate, Max Burst Size, Bounded Delay
Variable Bit Rate (VBR)—NORT: Specify Sustained Cell Rate, Max Burst Size
Available Bit Rate (ABR): Best Effort Service—No Bandwidth Guarantees Except for a Minimum Rate Negotiation
Unspecified Bit Rate (UBR): ABR without any Guaranteed Rate Clearly, an important issue in designing a WATM system is that the Medium Access Control (MAC) protocol, which specifies the method of access to the wireless channel among multiple users, must satisfy the basic requirements of ATM.

One method of implementing a MAC protocol is to use Time-Division Multiple Access (TDMA), wherein TDMA frames are divided into slots, each of which is assigned to an unique user. In general, this assignment can either be fixed, resulting in classical TDMA, or could be variable, resulting in reservation-based TDMA (R-TDMA). In R-TDMA, a sub-framing occurs in terms of different "phases" of the TDMA frame consisting typically of a "control" phase where reservations are asked and assigned, and a "data" phase, where transmission slots are used. To accommodate ATM QoS, the MAC protocol could implement R-TDMA utilizing a sequence of Control-Data Frames (CDFs), each CDF consisting of a control phase followed by a data phase. During the control phase, multiple wireless terminals specify a number of ATM slots required for their use. Once this request is successful, a certain number of ATM slots will be reserved for a particular wireless terminal and the wireless terminal can then transmit its designated packets in a specified sequence during the data phase.

To implement R-TDMA, the MAC layer needs a single prioritized buffer. Two issues are important to the MAC layer buffer control. First, incoming cells from the upper layer have to be sorted according to their ATM QoS specifications, i.e. ATM cells which have more immediate requirement must be sent earlier. Second, the MAC layer must support power saving, i.e., the MAC layer should be active only when required.

The prioritized buffer implementation presents a problem in buffer management, as memory fragmentation can result. For example, assume first that the buffer is empty. Then assume that 5 ATM cells occupied sequential addresses in memory. Because of QoS considerations, assume that ATM cells 2 and 4 were transmitted during the current CDF, leaving gaps in the buffer and resulting in a memory fragmentation problem. Since the buffer size cannot be infinite, a method must be found to reuse these gaps.

Generally, the fragmentation problem could be solved in software executed by the processor, i.e., a processor-based embedded system is used to manage defragmentation of the prioritized buffer. A simple technique could recopy all the "leftover" packets within the buffer to the head of the buffer. However, such a solution, although programmable, can be quite expensive with respect to the processor's resources. For bursty sources, it is possible that there may be a significant number of leftover packets within the buffer, and moving all of those packets is a significant overhead. Note that this creates two problems, namely that a significant amount of processor time could be used for memory defragmentation, and also that an upper bound to the amount of time that a processor needs for memory defragmentation is large causing problems in how the scheduling of processor tasks are to be undertaken.

Another solution with reference to the above architecture is to copy all the leftover ATM cells from the "input" buffer to another place, for example an additional buffer, and implement memory defragmentation in a controlled way using processor software, i.e., copy the leftover packets in the prioritized buffer to appropriate spaces within the additional buffer. This alleviates the problem significantly as compared to the method described above, as leftover packets occurring only during the current CDF must be moved every time. However, the problem in this technique is memory duplication and also the processor essentially implements two memory copy commands for every byte that is transmitted, namely one from the prioritized buffer to the additional buffer, and another from the additional buffer to the physical layer FIFO.

SUMMARY OF THE INVENTION

It is an object of the present invention to provide a sequentially accessible buffer including memory management means arranged to defragment the buffer, which management of defragmentation is implemented in a manner that the processor is not loaded with the problem of either relocating or "writing-around" leftover packets.

It is a further object of the present invention that such management of defragmentation is implemented in a simple and yet extremely controlled way which maximizes the buffer utilization, and minimizes the processor interaction with the defragmentation. In the case of a WATM terminal, minimizing processor interaction with the defragmentation enables better power-saving.

These and other aspects of the present invention are satisfied by providing a buffer comprising an addressable memory system which is divided into sequential equal-sized pages for storing respective data packets having the same number of bytes. (When the data packets are ATM cells, each is 53-bytes in length.) The invention is characterized in that the memory system further comprises first memory locations for storing tags associated with the respective pages, each tag indicating whether the associated page is empty or full; and address generation means responsive to data states derived from the stored tags, respectively, for developing a succession of addresses of memory locations in the memory system which control sequential writing into the buffer of bytes contained in data packets, the addresses in said succession jumping over addresses within pages which are full, thereby bypassing and avoiding overwriting pages which are full.

While the tags are generated by the processor, the data states derived from the stored tags, and the succession of addresses of memory locations are generated without further processor intervention.

The present invention is further characterized in that the address generation means comprises means responsive to said data states for forming first address components or pointers indicative of pages which are empty; means for forming second address components indicative of byte positions within packets; and means for combining the first and second address components. The succession of addresses of memory locations may be formed by simply concatenating page number and byte number.

A further aspect of the present invention is that the memory system comprises second memory locations for storing said data states; and means for deriving said data states from the stored tags, respectively, in a manner that a stored data state is preserved when a corresponding tag indicates that a corresponding page is full. The data states which control the formation of the succession of addresses of memory locations are thus derived from the tags written by the processor in a manner which avoids conflict between the processor's updating of tags and the generation of addresses in response to requirements dictated by the MAC layer.

Additional aspects of the present invention are that a variable number of the data packets are received or are to be transmitted within R-TDMA frames, each of which includes a data phase containing a plurality of time slots for containing data packets, and a control phase for reserving time slots, and further that the data packets correspond to respective types of services having respective quality of service requirements, and the memory system is a prioritized buffer for containing data packets sorted in accordance with the respective quality of service requirements of the type of traffic to which the packets correspond.

Other objects, features and advantages of the present invention will become apparent upon perusal of the following detailed description when taken in conjunction with the appended drawing, wherein:

DETAILED DESCRIPTION OF THE PREFERRED EMBODIMENTS

The present invention is described as part of a WATM terminal, as an example. However, it should be understood that the invention can be used in any case where a technique is needed to bypass occupied locations in a sequentially accessed buffer whose contents are still required, but may be overwritten and lost (typically in stream data applications).

Figure 1:
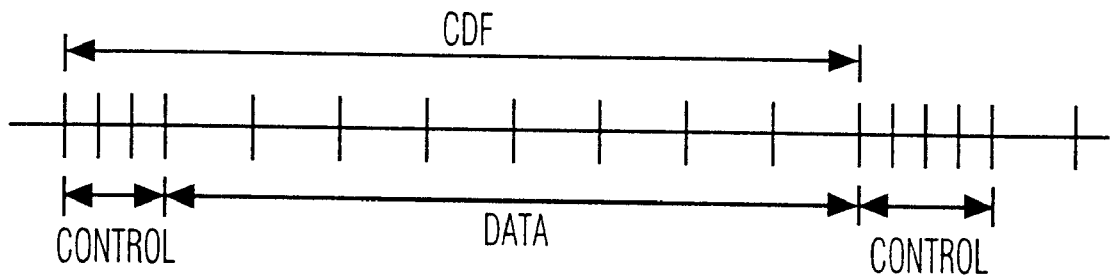
FIG. 1 shows the organization of a Control Data Phase (CDF)

Referring first to FIG. 1 of the drawing, the organization of a Control-Data Frame (CDF) is shown to consist of a control phase followed by a data phase. During the control phase, multiple wireless terminals specify a number of ATM slots required for their use. Once this request is successful, a certain number of ATM slots will be reserved for a particular wireless terminal and the wireless terminal can then transmit its designated packets in a specified sequence during the data phase. For the purpose of illustration, only the time axis is considered, where time is divided into slots, each of which equals the length of a control packet or a data packet plus some guard time.

Figure 2:
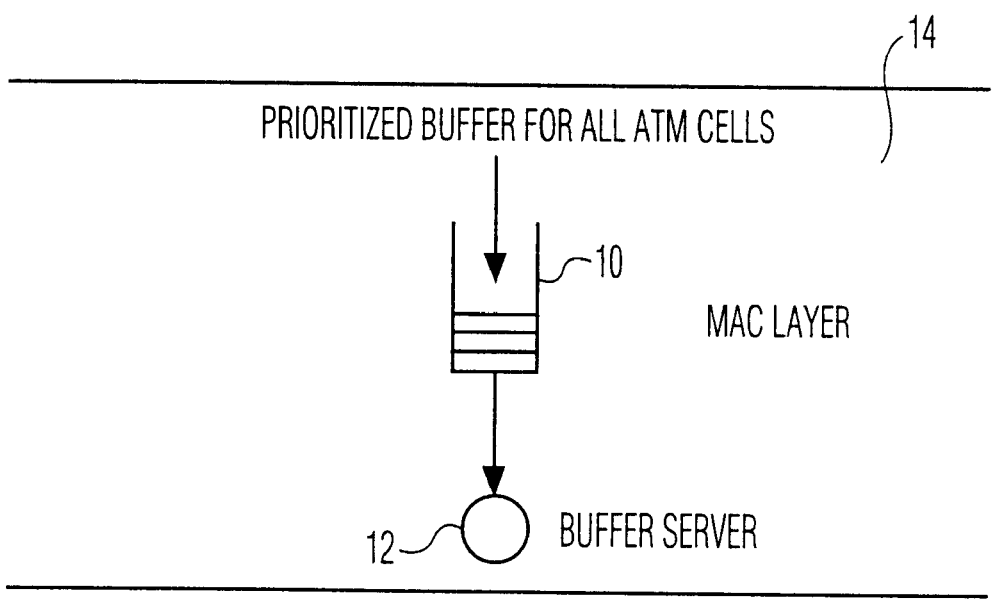
FIG. 2 generally illustrates a prioritized buffer within the MAC layer.

As an example, a typical embedded system implementation for wireless ATM is described. FIG. 2 generally shows a prioritized buffer 10 for all ATM cells and a buffer server 12, all within the MAC layer 14.

Figure 3:
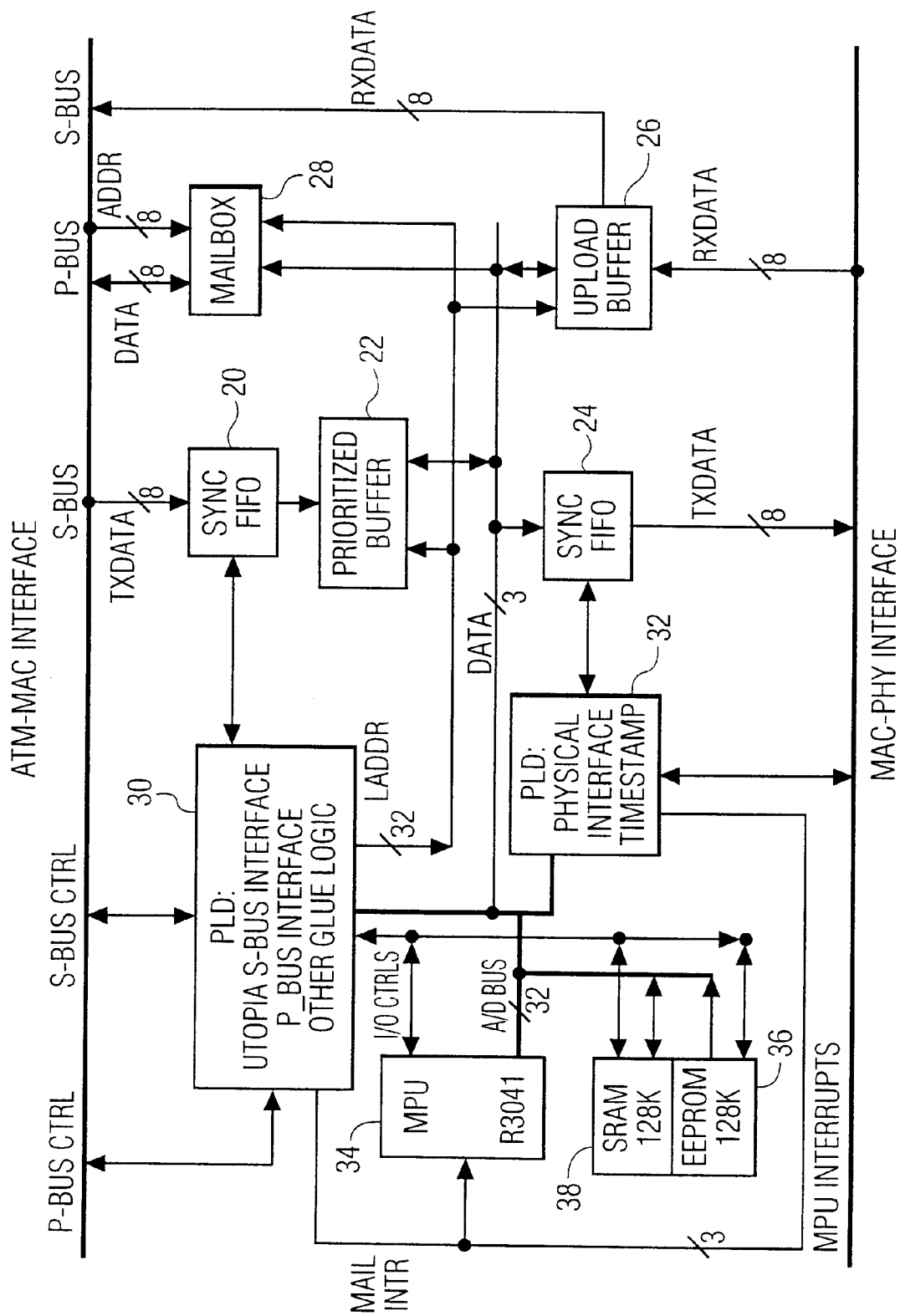
FIG. 3 shows the MAC subsystem in accordance with the present invention, including memory defragmentation circuitry.

FIG. 3 describes the hardware for the MAC subsystem which is very programmable to accommodate improvements in the MAC protocol. The MAC layer hardware design provides a buffered data path between an ATM-MAC interface to the ATM and a MAC-PHY interface to the physical layers PHY that allows for MAC layer scheduling and management functions to take place with a minimum of incurred delay or packet loss. The download data path from the ATM-MAC interface to the MAC-PHY interface includes: an input FIFO 20 to accommodate the data rate in accordance with the UTOPIA European standard and to cushion the ATM data flow so that memory defragmentation can be achieved; a prioritized buffer 22 which is composed of dual port, random access via one port, sequential access via the other, memories (SARAMs, not shown) in which scheduling takes place; and an output FIFO 24 to accommodate the physical layer data rate and also to allow for insertion of MAC overhead parameters.

Stream data enters buffer 22 via its sequential port to be operated on via its RAM port by the processor or MPU 34, and then passed on to the next layer, again via its sequential port.

The upload data path is also a SARAM upload buffer 26 that collects packets, allows RAM access to MAC layer data, and continues sequential access to the ATM layer. A DPRAM mailbox 28 is provided for mailbox functions between MAC and ATM layers to pass parameters and status information. Programmable devices (PLDs) 30 and 32, control the interfaces, the data paths and the time keeping functions. The processor or MPU 34 is coded to perform all scheduling and management functions. Preferably, a common hardware design is provided for use in a base station or in a wireless terminal. Two sets of operating code will be resident in EEPROM 36. By switch selection one of the two sets of code will be called into SRAM 38 on power up to configure as either a base station (BS) or as a wireless terminal (WT).

PLDs 30 and 32 are provided to augment the operations of MPU 34. PLD 30 contains the address latches and chip select decodes that implement the memory map, command and status registers for processor interaction, and the signal set to interface with the ATM layer via Utopia. PLD 32 complements the processor with the timestamp counter and the implementation of phases of the CDF. Additionally, PLD 32 contains the physical layer interface signal set, and the command and status registers to interact with MPU 34.

MPU 34 is preferably a MIPS RISC processor of the R3000 class, for example IDT79R3041. EEPROM 36 is preferably 128k in size and holds boot code, a monitor, and two sets of operating code (BS and WT). 128k of SRAM 38 is also preferably 128k in size; it provides storage for dynamic parameters and general work space.

To solve the memory fragmentation problem, the processor MPU 34 must first stop the flow of ATM packets from FIFO 20 into buffer 22, and then remove the gaps in the memory.

Figure 4:
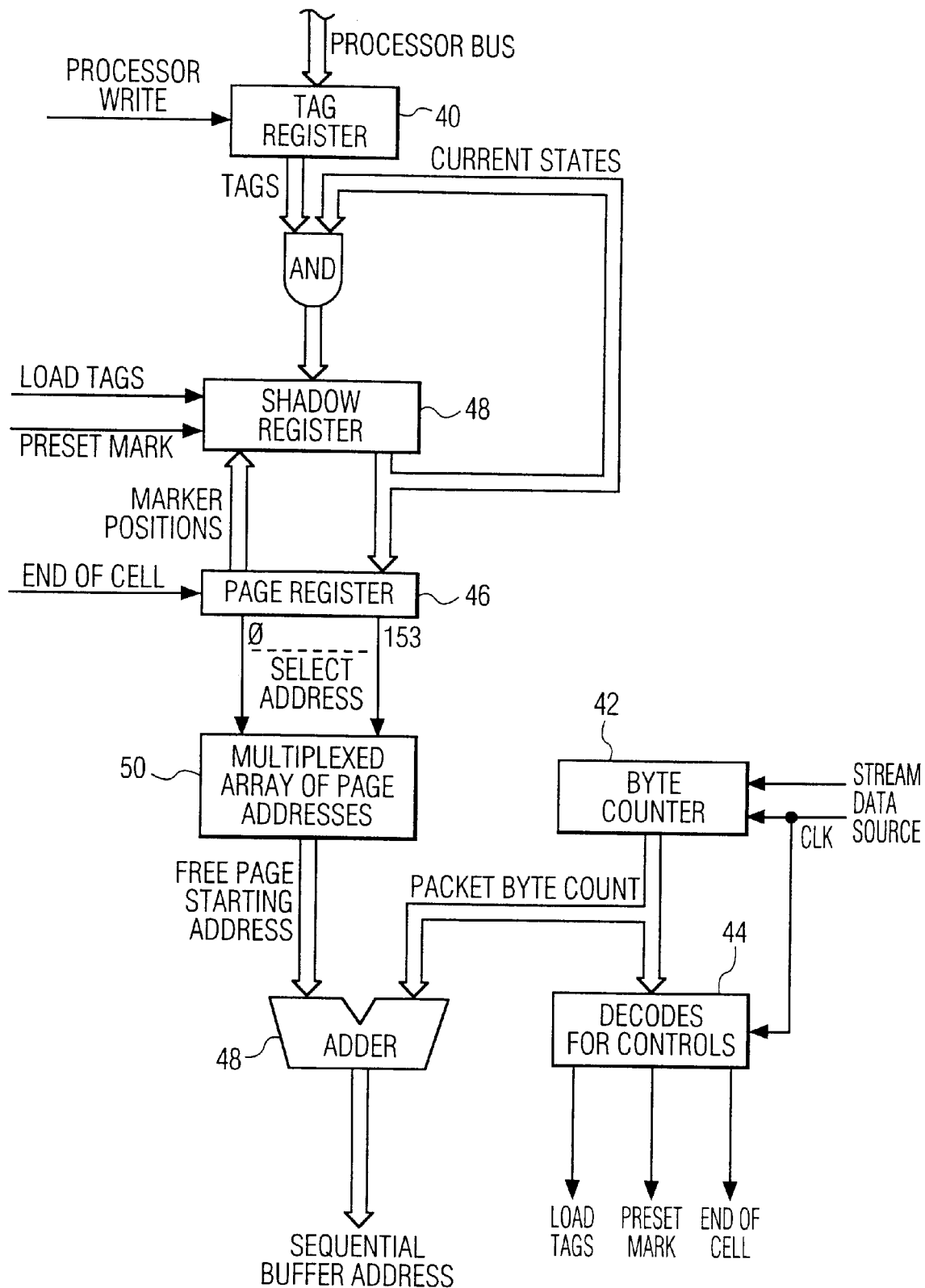
FIG. 4 shows a block diagram implementation of the memory defragmentation circuitry of FIG. 3, to implement a "write-around" method.

FIG. 4 shows as a block diagram the circuitry for implementation of memory defragmentation by a "write-around" method. In this Figure, ATM cells are assumed (53-byte packets) and the buffer is assumed to be composed of 154 ATM cells which is approximately 8K of memory. This Figure describes the additional hardware which controls the "prioritized buffer" address counter in FIG. 3.

The buffer is organized along packet boundaries or pages for convenience of operation and minimizing the logic to implement it. MPU 34, which executes the algorithms on the buffer, maintains a table of pointers to each packet boundary, and, therefore, knows the location of all leftover packets. A tag register 40 is provided, which has as many bits as there are packet boundaries in buffer 22. Each bit tags a boundary or page as either occupied with a leftover, or free for use, zero being free and one being taken. After each algorithm execution, MPU 34 refreshes tag register 40 by writing ones to those locations still occupied and resetting the remainder to zero.

As previously stated, buffer 22 is implemented as a dual port ram, one port being randomly accessed by MPU 34 while the other port is sequentially accessed by an address or byte counter 42, driven by the clock CL of the input stream data source. The counter 42 is decoded by decoder 44 to mark packet boundaries or ends of ATM cells in buffer memory 22, each referred to hereafter as "END OF CELL", as well as other predetermined byte counts within a cell or packet referred to hereafter as "LOAD TAGS" and "PRESET MARK". Upon decode of END OF CELL, a marker, or token bit, in a page register 46 is advanced to a position corresponding to the next empty fragment, or page, in buffer 22. A shadow register 48 is provided to track the progress of the marker bit in page register 46. Shadow register 48 fills with ones as packets fill the pages of buffer 22. MPU 34 reads the contents of shadow register 48 to determine how many packets are in buffer 22. After scheduling tasks are completed MPU 34 then writes to tag register 40 as previously described. Shadow register 48 keeps constant pace with incoming packets so as to avoid conflicts with updates to tag register 40 by MPU 34. The updates to tag register 40 are transferred to shadow register 48 conflict free. The marker bit in page register 46 is then caused to be set to the lowest free page in buffer 22.

The sequential addresses for addressing buffer 22 are formed as a sum by an adder 48 of two components, namely a free page starting address and a fixed length packet byte count output from byte counter 42, there being 53 bytes in a cell or packet for ATM. Each free page starting address is generated from a multiplexedarray of page addresses (preferably implemented as a gate array) in response to the position of the marker bit in page register 46. The END OF CELL decode from byte counter 42 is used to advance the marker bit position in page register 46, and the PRESET MARK and LOAD TAGS decodes from byte counter 42 update the shadow register and execute the tag updates.

Figure 5:
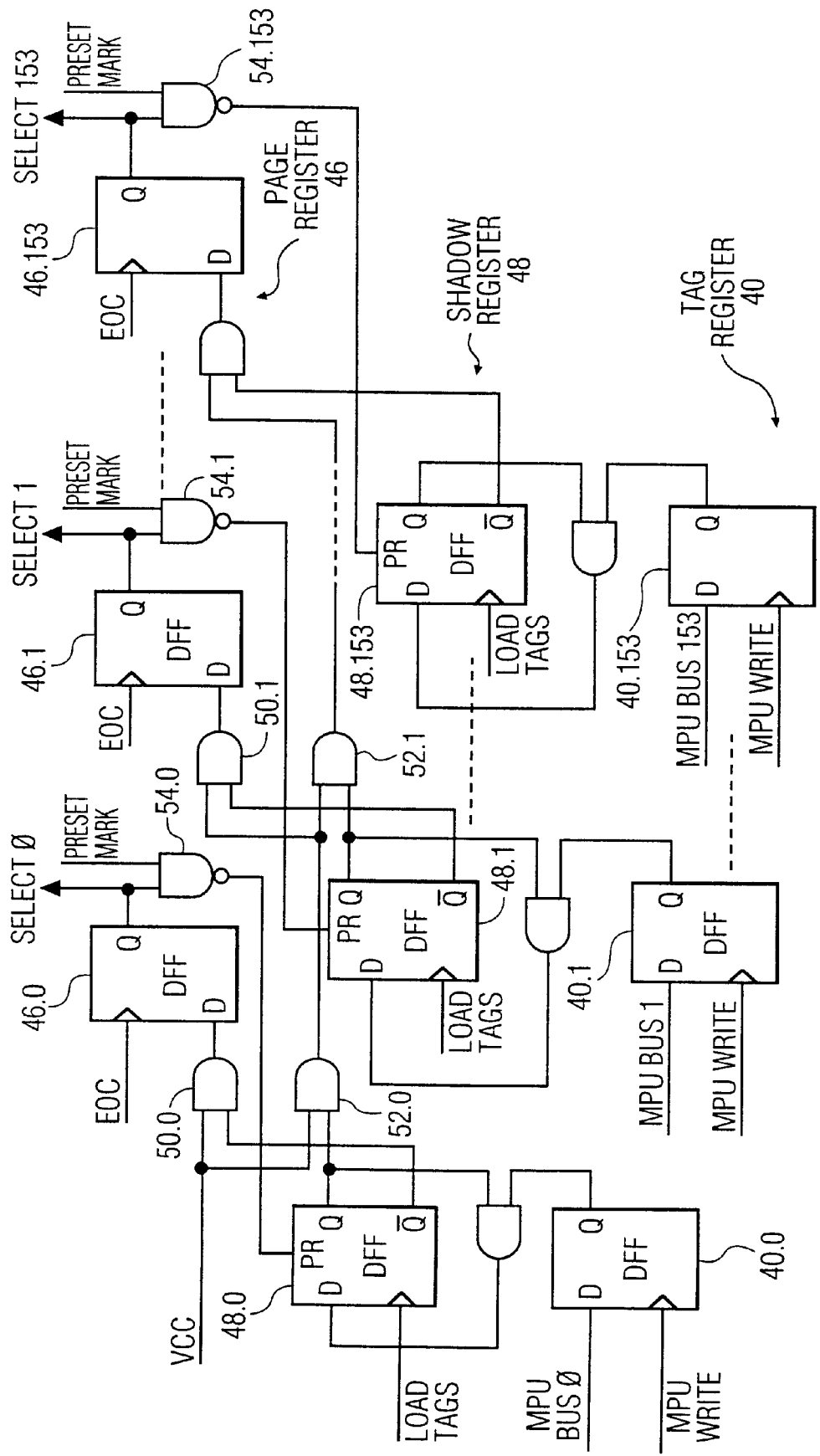
FIG. 5 shows the memory defragmentation circuitry of FIG. 4 in greater detail.

FIG. 5 illustrates the details of the interactions between page register 46 (composed of D flip-flops 46.0, 46.1, . . . 46.153), shadow register 48 (composed of D flip-flops or memory locations 48.0, 48.1, . . . 48.153) and tag register 40 (composed of D flip-flops or memory locations 40.0, 40.1, . . . 40.153). Tag register 40 may be written to by MPU 34 independently of any other operations via respective MPU BUS inputs to the D inputs and an MPU WRITE input to the toggle input of the respective flip-flops 40.0, 40.1, . . . 40.153. To transfer the update of tag register 40 to shadow register 48 conflict-free a command bit is set in response to the decode PRESET MARK and transferred in response to the decode LOAD TAGS so as not to interfere with shadow or marker bit movements.

Page register 46 and shadow register 48 interact through a network of AND gates 50.0, 50.1, . . . 50.153, and 52.0, 52.1, . . . 52.152 (not shown) which provide a logic one on the D input of the flip-flop of page register 46 at a position corresponding to the lowest free or empty page. AND gate 50.0 feeds the D input of flip-flop 46.0 and receives a first input which is a constant logic one provided by connection to power supply voltage VCC, and a second input which is the NOT Q output of flip-flop 48.0, whereas subsequent AND gates 50.1 . . . 50.153 in the series also feed the D inputs of the corresponding gates 46.1 . . . 46.153, and receive the second input which is the NOT Q output of the corresponding flip-flops 48.1 . . . 48.153. However the first inputs received by AND gates 50.1 . . . 50.153 are the outputs of gates 52.0 . . . 52.152 (not shown). AND gate 52.0 also receives a first input which is a constant logic one provided by connection to power supply voltage VCC, and receives a second input which is the Q output of flip-flop 48.0, whereas subsequent AND gates 52.1 . . . 52.152 (not shown) in the series also receive the second input which is the Q output of the corresponding flip-flops 48.1 . . . 48.2. However, the first inputs received by AND gates 52.1 . . . 52.152 (not shown) are the outputs of the immediately prior gates 52.0 . . . 52.151 (not shown).

Further NAND gates 54.0, 54.1, . . . 54.153 feed preset inputs of flip-flops 48.0, 48.1, . . . 48.153, respectively, and receive first inputs which are the Q outputs of flip-flops 46.0, 46.1, . . . 46.153, respectively, and a second input which is the PRESET MARK decode produced by decoder 44. On powering up, the page register zero location or position maintained by flip-flop 46.0 is preset to a logic one via NAND gate 54.0 while all other locations in all three registers are cleared to logic zero. Thus, page zero is initially active, while all others are initially inactive. A packet arriving from the stream data source causes the shadow register zero position maintained by flip-flop 48.0 to be set during its byte one interval in response to the LOAD TAGS decode, indicating this page is filled. Logic one is passed to page register position one maintained by flip-flop 46.1. This position is now enabled to be set while all other page positions are conditioned to be cleared by the END OF CELL decode produced by decoder 44 in response to the currently arriving packet.

It can be seen from the logic in FIG. 5 that if shadow register position one maintained by flip-flop 48.1 were set, the logic one originally derived from VCC would be passed on to the next page register position, bypassing or jumping over position one. If several successive positions in the shadow register were set, that the logic one would be passed on to the next position where the shadow register is at zero. This is the mechanism for writing around occupied locations in the buffer memory that contain leftover packets.

In this scheme MPU 34 reads the status of shadow register 48 to determine occupied positions. Tag register 40 is provided to operate on shadow register 48. A one written to a position in tag register 40 will preserve the current state of its companion in shadow register 48 while a zero will clear that position. Clearing indicates reuse of the position is possible while preserving indicates the content of the page is still needed. All updates occur during specific times during a packet reception (indicated by the various decodes from decoder 44) so that setup for the next packet is conflict free.

It should be appreciated that the objects of the invention have been satisfied by providing management of buffer defragmentation is implemented in a manner that processor MPU 34 is not loaded with the problem of either. relocating or "writing-around" leftover packets.

While the present invention has been described in particular detail, it should also be appreciated that numerous modifications are possible within the intended spirit and scope of the invention.

What is claimed is:

1. A buffer, comprising:
   an addressable memory system which is divided into sequential equal-sized pages for storing respective data packets having the same number of bytes, said memory system further including first memory locations for storing tags associated with the respective pages, each tag indicating whether the associated page is empty or full; and
   address generation means responsive to data states derived from the stored tags, respectively, for developing a succession of addresses of memory locations in the memory system which control sequential writing into the buffer of bytes contained in data packets, the addresses in said succession jumping over addresses within pages which are full, thereby bypassing and avoiding overwriting pages which are full.

2. The buffer as claimed in claim 1, wherein said address generation means includes:
   means responsive to said data states for forming first address components indicative of pages which are empty;
   means for forming second address components indicative of byte positions within packets; and
   means for combining the first and second address components.

3. The buffer as claimed in claim 1, wherein said memory system further includes:
   second memory locations for storing said data states; and
   means for deriving said data states from the stored tags, respectively, in a manner that a stored data state is preserved when a corresponding tag indicates that a corresponding page is full.

4. The buffer as claimed in claim 2, wherein said memory system further includes:
   second memory locations for storing said data states; and
   means for deriving said data states from the stored tags, respectively, in a manner that a stored data state is preserved when a corresponding tag indicates that a corresponding page is full.

5. The buffer as claimed in claim 1, wherein a variable number of the data packets are received or are to be transmitted within R-TDMA frames, each of which includes a data phase containing a plurality of time slots for containing data packets, and a control phase for reserving time slots.

6. The buffer as claimed in claim 1, wherein the data packets correspond to respective types of services having respective quality of service requirements, and said memory system is a prioritized buffer for containing data packets sorted in accordance with the respective quality of service requirements of the type of traffic to which the packets correspond.

7. The buffer as claimed in claim 5, wherein the data packets correspond to respective types of services having respective quality of service requirements, and said memory system is a prioritized buffer for containing data packets sorted in accordance with the respective quality of service requirements of the type of traffic to which the packets correspond.

8. A buffer, comprising:
   an addressable memory system which is divided into sequential equal-sized pages for storing respective data packets having the same number of bytes, the memory system further comprising first memory locations for storing tags associated with the respective pages, each tag indicating whether the associated page is empty or full; and
   address generation circuit responsive to data states derived from the stored tags, respectively, for developing a succession of addresses of memory locations in the memory system which control sequential writing into the buffer of bytes contained in data packets, the addresses in said succession jumping over addresses within pages which are full, thereby bypassing and avoiding overwriting pages which are full, wherein said address generation circuit includes
   means responsive to said data states for forming first address components indicative of pages which are empty,
   means for forming second address components indicative of byte positions within packets, and means for combining the first and second address components.

9. The buffer as claimed in claimed 8, wherein said memory system further includes:

second memory locations for storing said data states; and means for deriving said data states from the stored tags, respectively, in a manner that a stored data state is preserved when a corresponding tag indicates that a corresponding page is full.

10. The buffer as claimed in claim 8, wherein a variable number of the data packets are received or are to be transmitted within R-TDMA frames, each of which includes a data phase containing a plurality of time slots for containing data packets, and a control phase for reserving time slots.

11. The buffer as claimed in claim 8, wherein the data packets correspond to respective types of services having respective quality of service requirements, and said memory system is a prioritized buffer for containing data packets sorted in accordance with the respective quality of service requirements of the type of traffic to which the packets correspond.

12. A buffer, comprising:

an addressable memory system which is divided into sequential equal-sized pages for storing respective data packets having the same number of bytes, the memory system further comprising first memory locations for storing tags associated with the respective pages, each tag indicating whether the associated page is empty or full;

address generation circuit responsive to data states derived from the stored tags, respectively, for developing a succession of addresses of memory locations in the memory system which control sequential writing into the buffer of bytes contained in data packets, the addresses in said succession jumping over addresses within pages which are full, thereby bypassing and avoiding overwriting pages which are full; and wherein said memory system further includes second memory locations for storing said data states, and means for deriving said data states from the stored tags, respectively, in a manner that a stored data state is preserved when a corresponding tag indicates that a corresponding page is full.

13. The buffer as claimed in claim 12, wherein a variable number of the data packets are received or are to be transmitted within R-TDMA frames, each of which includes a data phase containing a plurality of time slots for containing data packets, and a control phase for reserving time slots.

14. The buffer as claimed in claim 12, wherein the data packets correspond to respective types of services having respective quality of service requirements, and said memory system is a prioritized buffer for containing data packets sorted in accordance with the respective quality of service requirements of the type of traffic to which the packets correspond.

* * * * *